US011873807B2

(12) United States Patent
Alexander et al.

(10) Patent No.: US 11,873,807 B2
(45) Date of Patent: Jan. 16, 2024

(54) PRESSURE WASHER SYSTEM

(71) Applicant: FNA Group, Inc., Pleasant Prairie, WI (US)

(72) Inventors: Gus Alexander, Inverness, IL (US); Paulo Rogerio Funk Kolicheski, Gurnee, IL (US); Michael C Hansen, Village of Lakewood, IL (US); Javier Penuelaz, Siloam Springs, AR (US)

(73) Assignee: FNA GROUP, INC., Pleasant Prairie, WI (US)

( * ) Notice: Subject to any disclaimer, the term of this patent is extended or adjusted under 35 U.S.C. 154(b) by 255 days.

(21) Appl. No.: 15/660,174

(22) Filed: Jul. 26, 2017

(65) Prior Publication Data

US 2018/0029056 A1 Feb. 1, 2018

Related U.S. Application Data

(60) Provisional application No. 62/367,372, filed on Jul. 27, 2016.

(51) Int. Cl.
*F04B 49/02* (2006.01)
*F04B 17/05* (2006.01)
(Continued)

(52) U.S. Cl.
CPC ................ *F04B 49/02* (2013.01); *B08B 3/02* (2013.01); *F02N 11/106* (2013.01); *F04B 17/05* (2013.01);
(Continued)

(58) Field of Classification Search
CPC .. B05B 7/12; B08B 3/026; B08B 3/02; B08B 2203/0241; B08B 2203/0223;
(Continued)

(56) References Cited

U.S. PATENT DOCUMENTS

| | | | | | |
|---|---|---|---|---|---|
| 3,047,725 | A * | 7/1962 | Spinelli | H02J 9/08 290/36 R | |
| 5,072,703 | A * | 12/1991 | Sutton | F02N 11/0803 307/10.6 | |

(Continued)

FOREIGN PATENT DOCUMENTS

| | | | |
|---|---|---|---|
| CN | 2786335 | Y | 6/2006 |
| CN | 201982539 | U | 9/2011 |

(Continued)

OTHER PUBLICATIONS

English machine translation of DE-102004029895-A1 (Year: 2006).*
(Continued)

*Primary Examiner* — Nathan C Zollinger
(74) *Attorney, Agent, or Firm* — Brian J. Colandreo; Jeffery T. Placker; Holland & Knight LLP

(57) ABSTRACT

A pressure washer may include a pump configured to receive a relatively low pressure fluid inlet and provide a relatively high pressure fluid outlet. The pressure washer may also include an engine coupled with the pump for driving the pump. An electric starter may be engageable with the engine for starting the engine. A flow sensor may be configured to provide a control signal in response to detecting fluid flow through the pump. The pressure washer may also include a controller configured to actuate the electric starter in response to the control signal when the engine is not operating.

17 Claims, 1 Drawing Sheet

(51) Int. Cl.
*F02N 11/10* (2006.01)
*B08B 3/02* (2006.01)
*F02B 63/06* (2006.01)

(52) U.S. Cl.
CPC . *B08B 2203/027* (2013.01); *B08B 2203/0241* (2013.01); *F02B 63/06* (2013.01); *F02N 2200/022* (2013.01); *F02N 2300/108* (2013.01)

(58) Field of Classification Search
CPC .... B08B 2203/027; F04B 17/06; F04B 17/05; F04B 49/03; F04B 49/02; F04B 49/10; F02B 63/06
See application file for complete search history.

(56) References Cited

U.S. PATENT DOCUMENTS 5,085,953 A 2/1992 Hayashi et al.
5,674,006 A * 10/1997 Islam .................. B01F 11/0017 206/219
5,765,995 A * 6/1998 Springer ................. F04B 49/06 417/63
7,449,994 B1 * 11/2008 Koerner ................ F02B 61/045 340/438
8,727,233 B2 5/2014 Karp
2003/0058087 A1 * 3/2003 Wenzel ..................... E02D 5/26 340/425.5
2006/0024253 A1 2/2006 Fack et al.
2006/0027253 A1 * 2/2006 Kaiser ..................... B08B 3/026 134/94.1
2008/0264374 A1 * 10/2008 Harris ....................... E02F 9/20 123/179.3
2010/0315246 A1 * 12/2010 Gilpatrick ............... G01F 23/04 340/623
2013/0092745 A1 * 4/2013 Karp ....................... B08B 3/026 239/1
2013/0111865 A1 * 5/2013 Hansen ................ A01D 34/828 56/11.3
2013/0343906 A1 * 12/2013 Funke ................... F02N 11/101 417/10
2014/0119949 A1 * 5/2014 Wischstadt ............. F04B 17/05 417/34
2014/0148991 A1 * 5/2014 Park ...................... F02D 41/222 701/31.1
2014/0203102 A1 * 7/2014 Gilpatrick ............ A01G 25/145 239/68
2014/0366830 A1 * 12/2014 Kawano .................... F02N 3/02 123/179.3
2015/0102121 A1 * 4/2015 Dey .......................... B05B 7/32 239/1
2016/0108881 A1 4/2016 Hansen et al.
2017/0350386 A1 * 12/2017 Alexander ................ B08B 3/02

FOREIGN PATENT DOCUMENTS

CN 102459844 A 5/2012
DE 102004029895 A1 * 1/2006 .............. F02N 11/10
WO WO-2016207547 A1 * 12/2016 .............. F02N 11/10

OTHER PUBLICATIONS

English machine translation of WO2016207547A1 (Year: 2016).*
Office Action dated Jun. 14, 2018 in counterpart Canadian Patent Application No. 2,974,606.
Office Action dated Apr. 12, 2018 in counterpart Canadian Patent Application No. 2,968,937.
First Chinese Office Action issued in CN Application Serial No. 201710407969.4 dated Sep. 20, 2018.
Canadian Office Action issued in CA Application Seriai No. 2,974,506 dated Mar. 14, 2019.
First Office Action dated Nov. 26, 2019 in counterpart Chinese Patent Application No. 201710627091.5.
Notice of Allowance issued in related Canadian Application Serial No. 2,974,606 dated Dec. 24, 2019.
Second Chinese Office Action dated Jun. 26, 2020 in related Chinese Patent Application No. 201710627091.5.

* cited by examiner

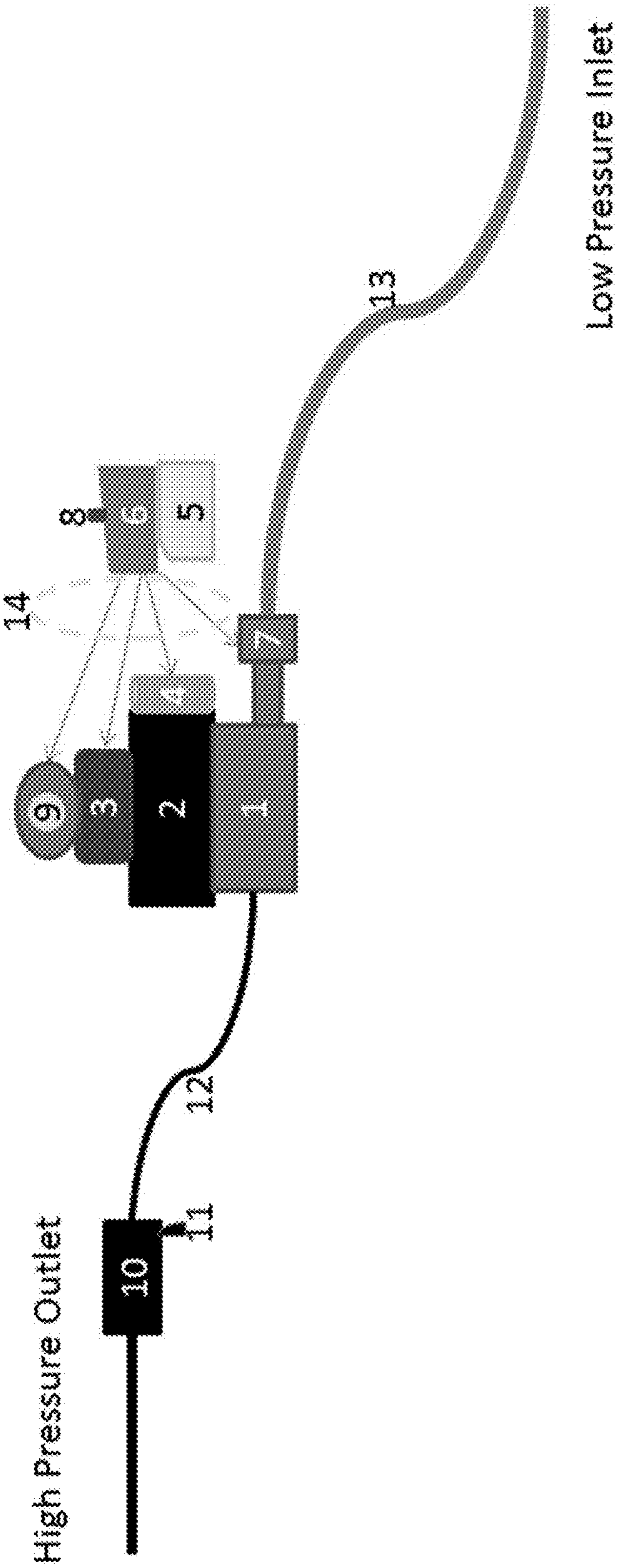
Low Pressure Inlet
High Pressure Outlet
1
2
3
4
5
6
7
8
9
10
11
12
13
14

PRESSURE WASHER SYSTEM

CROSS-REFERENCE TO RELATED APPLICATION

This application claims the benefit of U.S. provisional patent application Ser. No. 62/367,372, filed on Jul. 27, 2016, entitled "Pressure Washer System," the entire disclosure of which is incorporated herein by reference.

TECHNICAL FIELD

The present disclosure generally relates to pressure washer systems, and more particularly to pressure washer systems including automated starting functionality.

BACKGROUND

Many domestic and commercial water usage applications may require relatively high pressures, which may be beyond the capacity of residential and/or municipal water distribution and supply systems. For example, heavy duty cleaning applications may benefit from increased spraying pressure that is greater than the pressure available from common residential and/or municipal water distribution and supply systems. In some situations, various nozzles may be utilized to constrict the flow of the water to provide an increase in the pressure of the resultant water stream. However, many tasks may benefit from even greater pressures than can be achieved with common pressure nozzles that may be attached to a hose. In such circumstances pressure washers may be utilized, in which a power driven pump may be employed to increase the pressure significantly above pressures that are readily achievable using hose attachments. Such elevated pressures may increase the efficiency and/or effectiveness of some cleaning and spraying tasks.

While the increase in pressure that may be provided by a pressure washer may be useful for many applications, in many circumstances the demand for the pressurized water may be intermittent, or required on a stop and go basis. Often the intermittent demand for the pressurized water may be satisfied by manually starting an engine driving the pressure washer when the pressurized water is needed, and stopping the engine during time periods when the pressurized water is not needed. However, the need to continually start and stop the engine can often be viewed as burdensome or inconvenient.

SUMMARY

According to an embodiment, a pressure washer may include a pump configured to receive a relatively low pressure fluid inlet and provide a relatively high pressure fluid outlet. The pressure washer may also include an engine coupled with the pump for driving the pump. The pressure washer may also include an electric starter engageable with the engine for starting the engine. The pressure washer may also include a flow sensor configured to provide a control signal in response to detecting fluid flow through the pump. The pressure washer may further include a controller configured to actuate the electric starter in response to the control signal when the engine is not operating.

One or more of the following features may be included. The pump may include an axial piston pump. The electric starter may be associated with the engine. The electric starter may be associated with the pump. The flow sensor may be coupled with fluid inlet of the pump. The flow sensor may be coupled with the fluid outlet the pump. The flow sensor may be configured to detect fluid flow through the pump in response to opening of a demand valve. The demand valve may be controlled by a trigger assembly of a spray lance.

The controller may energize a starter motor of the electric starter in response to the control signal from the flow sensor. The controller may actuate a starter engagement mechanism of the electric starter in response to the control signal from the flow sensor. The controller may be further configured to provide a signal for controlling an automatic choke associated with the engine. The controller may be further configured to shut down the engine in response to the flow sensor detecting a discontinuation of flow through the pump. The controller may be configured to shut down the engine after a predetermined time period. The controller may be further configured to receive a signal indicating an operating state of the engine. The operating state of the engine may include a start fault associated with the engine. The operating state of the engine may include an operation fault associated with the engine. The controller may be further configured to conduct a diagnostic evaluation of one or more sensors prior to actuating the electric starter. The controller may be further configured to shut down the engine in response to determining a starter battery voltage below a threshold voltage.

According to another embodiment, a pump system may include a pump configured to receive a fluid inlet and provide a fluid outlet. An engine may be coupled with the pump for driving the pump to pump fluid from the fluid inlet and expel fluid from the fluid outlet. An electric starter may be engageable with the engine for starting the engine. A flow sensor may be coupled with the fluid inlet of the pump and configured to provide a control signal in response to detecting fluid flow through the pump. A controller may be configured to actuate the starter for starting the engine in response to the control signal from the flow sensor.

One or more of the following features may be included. The controller may be further configured to shut the engine down after a predetermined time period of not receiving the control signal from the flow sensor indicating fluid flow through the pump. The controller may be further configured to monitor one or more operating conditions associated with the engine.

According to another implementation, a pressure washer may include an axial piston pump having an inlet for receiving a relatively low pressure fluid and an outlet for providing a flow of relatively high pressure fluid. A control valve may be associated with a high pressure lance coupled with the pump outlet. A flow sensor may be coupled with the pump inlet and providing a control signal in response to detecting fluid flow through the pump when the control valve is opened. An engine may be coupled with the pump for driving the pump. An electric starter may be coupled with the engine for starting the engine. The pressure washer may further include a controller configured to actuate the electric starter to start the engine in response to the control signal from the flow sensor when the engine is not running.

BRIEF DESCRIPTION OF THE DRAWINGS

FIG. 1 schematically depicts a pressure washer system, according to an example embodiment.

DESCRIPTION OF EXAMPLE EMBODIMENTS

According to an embodiment, the present disclosure may generally relate to an engine driven pressure washer system. In general, the engine driven pressure washer system may provide automated starting of the engine in response to a demand for high pressure water. In some embodiments, the demand for high pressure water may include the opening of a flow valve on a high pressure side of the pressure washer fluid path. The flow control valve on the high pressure side of the pressure washer fluid path may include a trigger associated with a high pressure spray lance (e.g., pressure wand) that may be used for controlling the flow of high pressure water from the high pressure spray lance. The automated starting of the engine may allow on-demand high pressure water, while not requiring the engine to operate continuously (e.g., as when demand for the high pressure water is not required for greater than a threshold time period). It will be appreciated that, while the present disclosure is described in the context of a pressure washer, the concepts disclosed herein may be equally applicable to other pumping systems, e.g., which may provide high pressure and/or high flow rates of a fluid that are provided by an engine driven pump. Additionally, while the present disclosure may generally be described in the context of a pressure washer dispensing relatively high pressure water, the system herein may be used in connection with other fluids.

According to some implementations, starting of the engine may be based upon, at least in part, receiving an indication of flow associated with a low pressure inlet of the pressure washer system. For example, a demand for high pressure water may result from, and/or be indicated by, a valve on the high pressure side of the pressure washer system (e.g., a trigger on a high pressure spray lance) being opened. Opening the valve on the high pressure side of the pressure washer system may allow fluid flow through the system from the low pressure side of the pressure washer system to the high pressure side of the pressure washer system. In such an embodiment, a flow sensor may be associated with the low pressure source of the pressure washer system. For example, the flow sensor may be associated with a low pressure inlet of the pressure washer system. In response to the opening of the valve on the high pressure side of the pressure washer system, the flow sensor may provide a signal indicating flow of water through the pressure washer system. In response to the signal indicating flow of water through the pressure washer system, a start signal/control signal may be generated. The start signal may cause an electric starter associated with the engine (e.g., which may drive the pump of the pressure washer system) to be actuated (e.g., a starter motor may be energized and/or a starting mechanism for the engine may be engaged therewith for starting the engine). As such, the opening of the valve on the high pressure side of the pressure washer may result in an electric starter being energized and/or otherwise engaging a starting mechanism for the engine. Once the engine has been started by the starter/starter mechanism (herein generally referred to as the "starter"), the engine may drive the pump of the pressure washer system, thereby pressurizing the low pressure supply water to provide a high pressure flow of water on the high pressure side of the pressure washer system. In some embodiments, the initial flow of water through the pressure washer system may include a relatively low pressure flow (e.g., with the pressure not being increased by the operation of the engine driven pump). Further, it should be noted that while the example embodiment utilizes a valve on the high pressure side of the pressure washer system for allowing flow of water through the pressure washer system, and may result in starting of the engine, the valve may be located at any point in the fluid system relative to the flow sensor (e.g., as long as water may flow through the flow sensor when the valve is opened). Further, while the example embodiment is described as utilizing a flow sensor on the low pressure side of the pressure washer system, it will be appreciated that the flow sensor may be located at any point in the fluid system of the pressure washer system, as long as water may flow through the flow sensor in response to the valve being opened.

In some embodiments, the use of the flow sensor associated with the low pressure inlet side of the pressure washer system may eliminate the presence of electrical controls at the high pressure spray lance. In some situations, eliminating electrical controls at the high pressure spray lance may reduce the occurrence, or likelihood, of water damage to electrical controls or operator injury due to electrical faults, and/or may eliminate the need for electrical connections between the high pressure spray lance and the engine, pump, and/or control systems of the pressure washer system. In some implementations, this may reduce the number and type of connections that may be required between the high pressure spray lance and the engine, pump, and/or control systems of the pressure washer system. For example, a conventional high pressure spray lance may be utilized, while providing automatic starting functionality for the engine, while only requiring fluid coupling (e.g., via one or more hoses, or the like) between the high pressure spray lance and the pump. As will be described in greater detail below, various additional and/or alternative features may be implemented, such as automated control of engine parameters, automated stopping of the engine, (e.g., in response to a lack of demand for high pressure water, or in response to safety or mechanical health conditions), safety systems, and/or diagnostic systems.

Referring to FIG. 1, an illustrative example embodiment of a pressure washer system consistent with the present disclosure is schematically shown. As depicted, the pressure washer system may generally include a high pressure water pump 1 and an engine 2 for driving the high pressure water pump 1. As is generally know, the engine 2 and the water pump 1 may be mechanically coupled to one another to provide driving engagement between the engine 2 and the high pressure pump 1. The high pressure water pump 1 may include a variety of configurations, such as a piston pump, a centrifugal pump, a swashplate pump, or the like. Further, while the present disclosure is generally described in terms of a pressure washer, e.g., for providing a relatively high pressure outlet flow of water, the system herein may be suitably used in other applications in which a pump may be driven by an engine coupled to the pump for providing pumping and/or a flow of any fluid. As such, in addition/as an alternative to being a high pressure pump, the pump may be any conveyance pump. In various embodiments, the engine 2 may include any variety of internal combustion engine, such as a gasoline engine, a diesel engine, a propane or natural gas fired engine, as well as any other suitable engine.

As shown in FIG. 1, the pressure washer system may include a fluid system, which may generally include a low pressure inlet (e.g., via low pressure hose 13) to the high pressure water pump 1. The pressure washer system may also include a high pressure outlet (e.g., via high pressure hose 12) from the high pressure water pump 1. In an illustrative embodiment, the low pressure inlet may be coupled (via low pressure hose 13) to, for example a residential, commercial, or municipal water system which may provide a relatively low pressure supply of water. It will be appreciated that the low pressure inlet may be coupled to other sources of water. In some embodiments, the high pressure outlet from the high pressure pump 1 may include a high pressure spray lance 10, or wand. In some implementations, the high pressure spray lance 10 may include a valve (e.g., high pressure trigger 11) for controlling the flow of high pressure water emitted by the high pressure spray lance 10. In some situations, the valve may include a trigger-style valve, e.g., which may be squeezed, or otherwise operated, by a user of the pressure washer for controlling the flow of high pressure water emitted by the high pressure spray lance 10. Consistent with the depicted pressure washer system, low pressure water may be received at the low pressure input and may be pumped by/through the high pressure pump 1, and may be emitted by the high pressure outlet.

It will be appreciated that the terms "high pressure" and "low pressure" are intended for the purpose of comparison only. Further, while the description may generally relate to high pressure and low pressure, the system herein may suitably be used in connection with systems that may provide relative high flow and low flow (e.g., with the flow increase resulting from the operation of the pump 1) regardless of the relative pressure of the flows. For the purpose of description, "low pressure" may generally indicate a portion of the pressure washer system upstream from the high pressure pump 1, and "high pressure" may generally denote a portion of the pressure washer system downstream from the high pressure pump 1.

The pressure washer system may also include an inlet water flow sensor 7. The inlet water flow sensor 7 may include any suitable fluid flow sensor that may detect fluid flow through the pressure washer system. Various suitable fluid flow sensors are well known, and may be used. Illustrative examples of suitable fluid flow sensors may include, but are not limited to, optical sensors, piezoelectric sensors, sound sensors, reed switch-based sensors, magnetic sensors, and the like. In general, the inlet water flow sensor 7 may provide a signal in response to detecting fluid flow through the portion of the pressure washer fluid system with which the inlet water flow sensor 7 is associated. For example, the inlet water flow sensor 7 may form part of the fluid pathway between the source of the low pressure water and the exit of the high pressure water. The water flow sensor 7 may, accordingly, provide a signal in response to flow of water through the fluid pathway between the source of the low pressure water and the exit of high pressure water. The signal provided by the flow sensor may include any suitable mechanism for providing an indication of fluid flow through the pressure washer fluid system. For example, the signal may include an opening or closing of a circuit (e.g., the opening or closing of a switch), a change in resistance, a change in capacitance, a high or low voltage signal, a digital signal, an analog signal, or other means by which the detection of fluid flow may be conveyed.

Consistent with the foregoing, when the valve is opened (e.g., by squeezing the high pressure trigger 11), flow of water through the pressure washer system may be initiated. In some embodiments, the flow of water through the pressure washer system may be initiated based upon, at least in part, the pressure provided by the low pressure water supply (e.g., which may include domestic, commercial, or municipal water supply). When flow of water through the pressure washer system is initiated (e.g., by squeezing the high pressure trigger 11), the inlet water flow sensor 7 may detect the flow of water through the pressure washer system, and may provide a signal indicative of the water flow. The signal provided by the inlet water flow sensor 7 may be received by controller 6.

In the illustrated example, the inlet water flow sensor 7 has been depicted as being associated (e.g., by fluid coupling) with the low pressure inlet side of the pressure washer system. For example, the inlet water flow sensor 7 may be fluidly coupled with a low pressure inlet into the high pressure water pump 1. The placement of the inlet water flow sensor 7 on the low pressure inlet side of the pressure washer system may allow the use of a more economical flow sensor, e.g., which may be required to withstand lower pressures and/or may provide a longer service life when subjected to relatively lower pressures (e.g., as compared to an expected service life when subjected to relatively higher pressures). However, it will be appreciated that the flow sensor may be positioned at any point along the fluid pathway of the pressure washer system, as long as the flow sensor is capable of measuring flow in response to the opening of the valve (e.g., which may include the high pressure trigger). For example, as discussed above, flow through the pressure washer system may be initiated by opening a valve in the fluid pathway of the pressure washer system, and the flow may be detected by a flow sensor, which may provide a signal to the controller. As such, the valve and the flow sensor may be disposed at any locations along the flow pathway as long as opening the valve allows flow through the fluid pathway that may be detected by the flow sensor.

Continuing with the example depicted in FIG. 1, the controller 6 may include any suitable microcontroller, or off the shelf or specialized circuitry or hardware, that may receive the signal from the inlet water flow sensor 7 indicating fluid flow. Accordingly, controller 6 may utilize one or more of software, firmware, and hardware programming to implement any of the control processes provided the by controller 6. The controller may be configured to actuate the electric starter in response to the control signal. For example, in response to receiving the signal from the inlet water flow sensor 7, the controller may provide a start signal to a starter 4 that is capable of being coupled (directly or indirectly) with the engine 2 for starting the engine 2. The start signal from the controller may, for example, include power for energizing a starter motor of the electric starter. Additionally and/or alternatively, the signal from the controller may include actuating a starter engagement mechanism of the electric starter.

The starter 4 may include various electric starter configurations that may be engageable with the engine for starting the engine. For example, the electric starter may include a starter motor coupled and/or engageable with the engine 2 for providing rotation of the engine crankshaft to start the engine 2. In some embodiments, the starter 4 may include an electric starter motor and an actuating mechanism to allow the electric starter motor to be selectively rotationally coupled with the engine to start the engine. As such, the starter may include various features such as a motor, a gear train, a solenoid or Bendix drive (e.g., for engaging the starter motor with the engine in an implementation in which the starter motor is not continuously engaged with the engine, for example, by way of an overrunning clutch or the like), as well as various other features. According to various embodiments, the electric starter may be associated with the engine (e.g., by being a component of the engine, by being mounted to the engine, and/or by being mounted to a common frame or chassis with the engine), may be associated with the pump (e.g., may be coupled to and/or engageable with an input shaft of the pump, may be mounted to a pump housing or a common frame or chassis with the pump), and/or may be a separate component from the engine and the pump. Accordingly, and as generally discussed above, the control, or start, signal from the controller 6 may include energizing the starter motor and/or energizing a starter engagement mechanism to engage (e.g., rotationally couple—either directly or indirectly) the starter motor with a drive shaft of the engine. In some embodiments, the starter 4 and/or the controller 6 may be powered by an electrical supply, such as a battery 5. In some implementations, the battery may include a rechargeable battery. The rechargeable battery may include a special purpose battery, may include a battery such as may commonly be used in connection with battery powered power tools, and/or may include a general purpose battery.

In some implementations, for example in which the battery 5 may include a lithium ion (Li-Ion) battery, the controller 6 may provide a "soft-start" activation of the motor 4. For example, the controller may provide a Pulse Width Modulated (PWM) current to the starter. Such a soft-start may at least partially mitigate high currents during inrush of power to the starter 4 from the battery, e.g., by spreading-out the energy demands of the starter 4 over an extended time period. According to such an implementation, the inrush surge current may be maintained within the desired operating specifications of a Li-Ion removable battery. Similar soft-start configurations may be implemented in connection with other battery types and/or electrical power supplies.

As generally discussed above, squeezing the high pressure trigger 11 may initiate the flow of water through the pressure washer system. Initiation of the flow of water through the pressure washer system may be detected by the inlet water flow sensor 7, which may provide a signal to the controller 6. Upon receiving the signal from the inlet water flow sensor 7, the controller may provide a start signal to the starter 4. In some embodiments, providing the start signal to the starter 4 may include providing a sufficient supply of current to the starter 4 to energize the starter motor to crank-over the engine 2 and/or providing a sufficient supply of current (and/or an actuation signal) to an engagement mechanism to cause the starter motor to rotational couple with the engine. Once the engine 2 has been cranked-over by the starter 4 sufficiently to start the engine 2, the engine 2 may drive the high pressure water pump 1. With the engine 2 driving the high pressure water pump 1, the low pressure water supply may be pressurized to provide a high pressure outlet water stream from the high pressure spray lance 10. Accordingly, when the engine 2 is not currently operating, a user may receive high pressure water on demand by squeezing the high pressure trigger 11 of the high pressure spray lance 10. In some implementations, the delay between squeezing the high pressure trigger 11 and receiving the desired high pressure stream of water may be relatively small, e.g., based upon a starting time of the engine 2.

In some implementations, the controller 6 may also be configured to stop the engine 2 when there is no longer a demand for the pressurized water. For example, when the high pressure trigger 11 is released, water flow through the pressure washer system may stop, and the inlet water flow sensor 7 may no longer provide a signal indicating flow through the pressure washer system (e.g., as by providing no signal and/or by providing a signal indicating no flow, and/or flow below a determined threshold). In some embodiments, the controller 6 may stop the engine 2 after a predetermined time period of no flow demand (e.g., 20 seconds, 30 seconds, a minute, or any other desired period of time). Additionally/alternatively, the controller 6 may stop the engine 2 immediately upon cessation of flow through the pressure washer system. As such, not only may the pressure washer system provide high pressure water on demand, the pressure washer system may also minimize the unnecessary operation of the engine 2 (e.g., during time periods in which no high pressure water is requested).

Various additional features may be included, e.g., which may increase the ease of operation, efficiency of operation, and/or safety of using the pressure washer system. For example, the controller 6 may be capable of providing additional functionality. In some implementations, the controller 6 may include a microcontroller, e.g., which may be capable of providing a multitude of additional features or functionality. In some situations, the additional features or functionality provided by the controller 6 may be achieved at comparatively little additional cost. However, even in an embodiment in which the controller 6 includes specialized hardware and/or circuitry, various additional features and/or functionality may also be provided.

In some embodiments, the pressure washer system may include an automatic choke 9 associated with the engine 2. The automatic choke 9 may facilitate starting of the engine 2, and may allow operation of the engine 2 to be adjusted to improve starting and/or operating performance of the engine. The automatic choke 9 may include an electromechanical actuator (e.g., such as a servo actuator, a solenoid, or the like), a pneumatic or hydraulic actuator, or other actuator that may vary a choke setting associated with the engine 2. The automatic choke 9 may, for example, receive a control signal from controller 6, and may adjust the position of the choke 9 in response to the received control signal. In some implementations, controller 6 may receive one or more sensor inputs that may be utilized in determining a desired choke setting, which may be implemented via the automatic choke 9. For example, the pressure washer system may include one or more of ambient temperature sensors, engine temperature sensors, engine runtime sensors (e.g., which may determine aggregate runtime of the engine, time since last running of the engine, etc.), as well as various other suitable sensors. The controller 6 may receive the inputs from the one or more signals, and may determine a desired choke setting based upon, at least in part, one or more of the sensor inputs.

The pressure washer system may, in some implementations, include one or more sensors configured to monitor the operation of the engine 2. In one illustrative example, the pressure washer system may include a sensor configured to monitor a voltage and/or current generated by the engine magneto 3 associated with the engine 2. In some such embodiments, a voltage sensor monitoring a voltage generated by the engine magneto 3 may, for example, provide a signal indicating operation of the engine 2 (e.g., based upon, at least in part, a voltage being generated by the magneto 3) and/or operating conditions associated with the engine 2 (e.g., based upon, at least in part, a magnitude and/or pulse width or pulse timing of the voltage being generated by the magneto 3). The signal provided by the engine monitoring sensors may be transmitted to the controller 6, which may utilize the signals to, for example, determine that the engine has started allowing the starter 4 to be de-energized or disengage from the engine during the starting process, to determine that the engine 2 is running, and/or to determine one or more operating characteristics of the engine 2. It will be appreciated that one or more additional and/or alternative sensors may be utilized for determining operating conditions associated with the engine 2, such as an RPM sensor (e.g. a Hall effect sensor associated with the engine crankshaft, etc.), an engine temperature sensor, as well as various other sensors.

The pressure washer system may, in some embodiments, include a battery health monitor. For example, as discussed above, the pressure washer system may include a battery 5, which may be utilized for starting the engine 2, and/or optionally for powering controller 6 and/or other electronic/electromechanical features of the pressure washer system (although one or more of the controller 6, and one or more electronic/electromechanical features of the pressure washer system may be powered by a separate battery or power source than that used for starting the engine 2). As such, in an illustrative embodiment, the pressure washer system may include one or more sensors that may monitor a health of one or more batteries associated with the pressure washer system. The battery health monitor may include a voltage sensor, e.g., which may indicate the voltage of the battery (and/or whether the voltage is above a predetermined safe operating threshold). Various additional and/or alternative characteristics of the battery may also be monitored. In an embodiment, the battery health monitor may provide a signal to the controller 6, and/or to one or more status indicators, indicative of the battery health characteristics of the battery. Controller 6 may, for example, allow or disallow starting of the engine 2 based upon, at least in part, the determined battery health. For example, if the voltage of the battery indicates that the battery is in a discharged, damaged, or unsafe state, the controller 6 may prevent starting of the engine 2 using the electric starter 4. Further, one or more user perceptible status indications may be provided concerning the health of the battery.

In some embodiments, the pressure washer system may include one or more status or information indicators. The status indicators may, for example, provide an indication of an operating condition (e.g., running, standby, or fault condition), and/or may provide information concerning a detected fault (e.g., failure to start, failure of the engine to continue running, or the like), a battery condition (e.g., voltage, charged/discharged state, battery error, or the like), as well as various other information. In an illustrative embodiment, the status indicator may include one or more LED's 8. The one or more LED's may indicate various system information, e.g., by being illuminated, not illuminated, various blinking patterns, or the like. In some implementations, more than one LED, and/or more than one LED color, may be utilized for providing status information. Further, in some implementations, other status indicators, such as LCD displays or the like, may be utilized for providing system status information. The system status indicators may be controlled by controller 6, and/or one or more additional control devices.

The pressure washer system may, in some embodiments, include one or more manual controls. In some implementations, the one or more manual controls may allow for manual operation of one or more aspects of the pressure washer system. For example, the manual controls may allow for one or more of manual starting of the engine 2 (e.g., in addition and/or as an alternative to automatic starting of the engine 2 by energizing the starter 4), manual adjustment of the choke, manual stopping of the engine 2, as well as various additional and/or alternative manual controls. In an illustrative embodiment, the manual controls may include a push button 8, e.g., which may be integrated with the status indicator. It will be appreciated that various additional and/or alternative manual controls may also be utilized.

As generally discussed above, the pressure washer system may generally provide a functional linkage between the user operation of the high pressure trigger 11 and the subsequent detection of flow by the inlet water flow sensor 7. For example, as long as water pressure is provided to the low pressure inlet (e.g., via low pressure inlet hose 13) water may flow from the low pressure inlet side to the high pressure outlet side whenever the high pressure trigger 11 is pulled. In some implementations, this may occur regardless of the operating state of the engine 2 and/or the high pressure pump 1. In a related manner, water flow from the low pressure inlet side to the high pressure outlet side may be stopped whenever the high pressure trigger 11 is released.

In an automatic operating mode, the controller 6 may start the engine 2 in response to a demand for high pressure water, e.g., based upon the high pressure trigger 11 being pulled. In an illustrative embodiment, prior to activating the starter 4, the controller 6 may use an algorithm in the firmware/software/hardware to calculate a desired starting setting for the choke 9 (e.g., which may be associated with the carburetor of the engine 2, in some embodiments). The algorithm implemented by the controller 6 may employ one or more of aggregate running time of the engine 2 for the current session, engine temperature, and ambient air temperature in calculating a choke solution. The controller 6 may drive a servo controller coupled to the choke 9 to the desired setting for starting the engine 2. When flow is detected by the inlet water flow sensor 7 (e.g., as a result of the high pressure trigger 11 being squeezed), the controller may start the engine 2. In an implementation, starting the engine 2 may include the use of a "soft-start" Pulse Width Modulation (PWM) activation of the starter motor 4. This soft-start may mitigate high currents during inrush of power to the starter 4 by spreading-out the starter motor 4 energy demands over an extended time period thus keeping inrush surge current within the Li-Ion removable battery specifications. During starting of the engine, the controller may monitor the engine magneto 3 voltage to ensure that the engine 2 is rotating ("turning over") in response to starter motor 4 activation. If, for any reason, the engine 2 were to seize, or otherwise not turn over, the controller 6 may terminate the starter motor 4 activation, which may avoid excessively high starter motor 4 currents that could damage the system.

In addition/as an alternative to automatic starting of the engine 2, in some implementations the pressure washer system may allow for manual operation of the pressure washer system. For example, the pressure washer system may be operated manually, e.g., either without a removable Li-Ion Battery 5 inserted in the system, and/or with a discharged ("dead") battery. According to an example implementation, the system may be started and stopped manually by the user. Once the engine 2 has been started the pressure washer system may keep running until the user turns it off (or it runs out of fuel). In some implementations, the manual operation of the pressure washer system may be independent of the usage of the High Pressure Trigger 11. According to one such implementation, to start the pressure washer system, the user may use a mechanical override to set the starting choke position, and may manually operate a recoil starter (or other mechanical starting mechanism) associated with the engine 2. Upon a successful start of the engine 2, the user may manually move the choke override into a running position. In some implementations, a "deadman" circuit may allow the user to shut down the engine 2 by pressing and holding the LED Push Button Switch 8. It will be appreciated that in some circumstances (e.g., when no batter 5 is installed, and/or the battery 5 is discharged) no LED flash indication may be displayed.

An illustrative example of an operating sequence for the pressure washer system, in automatic operation mode, may include a user checking the engine 2 to ensure proper oil and fuel levels, and replenishing the oil and/or fuel as needed. The pressure washer system may be placed near a desired work area. The high pressure hose 12 may be connected to the high pressure spray lance 10. The low pressure water hose 13 may also be connected to the inlet water flow sensor 7, and the water source may be turned on. A freshly charged Li-Ion removable battery 5 may be inserted into the corresponding battery receptacle of the pressure washer system (e.g., which may be associated with the controller 6, in some embodiments). In some embodiments, the LED push button switch 8 may provide an indicator or a ready/idle condition (e.g., via a slow blinking of the LED 8, or other indicator). The LED push button switch 8 may be pressed and released to enter an active state. In some embodiments, the LED indicator 8 may stop blinking to indicate the active state, and/or may provide another indication of the active state. With the high pressure spray lance 10 aimed at a surface to be cleaned (and/or to otherwise receive a spray of high pressure water), the high pressure trigger 11 may be squeezed. In response to squeezing the high pressure trigger 11 (e.g., and a resulting detection of water flow through the pressure washer system), the starter 4 may be energized, and the engine 2 may start. In an embodiment, the LED indicator 8 may blink rapidly, and/or otherwise indicate that starting of the engine 2 is occurring. The high pressure trigger 11 may be held and the high pressure stream of water may be directed as desired using the high pressure spray lance 10. In an embodiment, the LED indicator 8 may be continuously illuminated, and/or may otherwise indicate normal operation. The high pressure stream of water may be turned on and off as desired using the high pressure trigger 11. In some embodiments, should the high pressure trigger 11 not be pulled for a period of 20 seconds (and/or for any other determined time period), the engine 2 may be automatically shut off. In an embodiment, the LED indicator 8 may blink rapidly, and/or otherwise provide an indication that the engine 2 is being shut-off. The engine 2 may be automatically restarted once the high pressure trigger 11 is pulled again (e.g., which result in an indication of flow by the inlet water flow sensor 7). In some implementations, the engine 2 may be stopped at any time, e.g., by pressing an holding the LED push button switch 8 until the engine 2 is completely shut off. It will be appreciated that the above operating sequence is provided for illustrative purposes only, and one or more operations may be added or eliminated, and operations may occur in differing orders, e.g., depending upon the circumstances of use, the set-up of the pressure washer system, and/or various additional and/or alternative factors or criteria.

During use of the pressure washer system in automatic mode, various faults, exceptions, or problematic conditions may occur. The pressure washer system may provide an indication of the occurrence of such exceptions (e.g., via the LED indicator 8), and or may undergo various curative or remedial operations. Four illustrative example conditions may include a low battery exception, a failure to start exception, a locked rotor exception, and a failure to keep running exception. It will be appreciated that various additional and/or alternative exceptions/faults/conditions may arise, which may be indicated and/or may result in curative and/or remedial operations. Additionally, it will be appreciated that any indications of such exceptions is intended for illustrative purposes only, and various additional and/or alternative indication may be utilized.

The voltage of the Li-Ion removable battery 5 may be periodically and/or continuously monitored to ensure that there is enough energy stored in the battery 5 to start the engine. Should the voltage of the battery 5 drop below the threshold voltage (e.g., 15.5 volts for an 18 volt rechargeable battery), the controller may identify a low battery exception. In response to the controller 6 identifying a low battery exception, the LED indicator 8 may provide an indication of the low battery exception, e.g., by displaying two quick flashes every two seconds. In some embodiments, if the engine is running at the time of the low battery exception, the engine 2 may be automatically shut down (e.g., by controller 6). Further, in some embodiments, further automatic operation of the pressure washer system may be prevented until the Li-Ion battery 5 is replaced with a properly charged battery.

If the controller 6 does not sense rotation of the engine 2 (e.g., no voltage, or insufficient voltage, is detected at the magneto 3) in response to energizing the motor of the starter 4, the controller 6 may identify a locked rotor exception. In response to identifying a locked rotor exception, the controller 6 may immediately terminate the automatic starting procedure to prevent/reduce the likelihood of an overcurrent event. In an embodiment, in response to identifying a locked rotor exception, the LED indicator 8 may provide three quick flashes every two second. In an embodiment, in response to identifying a locked rotor exception, automatic operation of the pressure washer system may be prevented. In some embodiments, the user may have to reset the system by removing the Li-Ion battery 5, rectifying the locked rotor condition, and then reinserting the Li-Ion battery 5.

If the engine 2 fails to automatically start after five (or some other determined number) of contiguous starting attempts, the controller 6 may identify an unsuccessful start exception. In an embodiment, in response to controller 6 identifying an unsuccessful start exception, the LED indicator may display two quick flashes every two seconds. In an embodiment, automatic operation of the pressure washer system may be prevented. In some embodiments, the user may have to reset the pressure washer system by removing the Li-Ion battery 5, rectifying the cause of the starting problem, and reinserting the Li-Ion battery 5.

If, after an automatic start of the engine 2, the engine 2 drops below 500 RPM (or some other determined threshold operating speed), the controller 6 may identify a failure to keep running exception. In response to identifying a failure to keep running exception, the LED indicator 8 may display four quick flashes every two second. In some embodiments, in response to identifying a failure to keep running exception, the controller 6 may carry out an automatic shutdown. In some embodiments, the user may have to reset the pressure washer system by removing the Li-Ion battery 5, rectifying the cause of the starting problem, and reinserting the Li-Ion battery 5.

A variety of features of the variable flow rate pump have been described. However, it will be appreciated that various additional features and structures may be implemented in connection with a pump according to the present disclosure. As such, the features and attributes described herein should be construed as a limitation on the present disclosure.

What is claimed is:

1. A pressure washer comprising:

a pump having a relatively low pressure fluid inlet and a relatively high pressure fluid outlet;

an engine coupled with the pump for driving the pump;

an electric starter for starting the engine, the electric starter is one or more of engageable with an input shaft of the pump and mounted to a pump housing;

a flow sensor configured to provide a control signal in response to detecting fluid flow through the pump; and a controller configured to actuate the electric starter in response to the control signal when the engine is not operating, including providing a pulse width modulated current to the electric starter, the controller further providing engine fault detection including monitoring a voltage detected at an engine magneto and discontinuing automated starting upon detection of one or more of no voltage and an insufficient voltage indicating a locked rotor exception to avoid an overcurrent event in the electric starter.

2. The pressure washer according to claim 1, wherein the pump includes an axial piston pump.

3. The pressure washer according to claim 1, wherein the electric starter is associated with the engine.

4. The pressure washer according to claim 1, wherein the flow sensor is coupled with the fluid inlet of the pump.

5. The pressure washer according to claim 1, wherein the flow sensor is coupled with the fluid outlet of the pump.

6. The pressure washer according to claim 1, wherein the flow sensor is configured to detect fluid flow through the pump in response to opening of a demand valve.

7. The pressure washer according to claim 6, wherein the demand valve is controlled by a trigger assembly of a spray lance.

8. The pressure washer according to claim 1, wherein the controller energizes a starter motor of the electric starter in response to the control signal from the flow sensor.

9. The pressure washer according to claim 1, wherein the controller actuates a starter engagement mechanism of the electric starter in response to the control signal from the flow sensor.

10. The pressure washer according to claim 1, wherein the controller is further configured to provide a signal for controlling an automatic choke associated with the engine.

11. The pressure washer according to claim 1, wherein the controller is further configured to shut down the engine in response to the flow sensor detecting a discontinuation of flow through the pump.

12. The pressure washer according to claim 11, wherein the controller is configured to shut down the engine after a predetermined time period.

13. The pressure washer according to claim 1, wherein the controller is further configured to receive a signal indicating an operating state of the engine.

14. The pressure washer according to claim 13, wherein the operating state of the engine includes a start fault associated with the engine.

15. The pressure washer according to claim 13, wherein the operating state of the engine includes an operation fault associated with the engine.

16. The pressure washer according to claim 1, wherein the controller is further configured to conduct a diagnostic evaluation of one or more sensors prior to actuating the electric starter, wherein the one or more sensors includes one or more of the flow sensor and one or more additional sensors.

17. The pressure washer according to claim 1, wherein the controller is further configured to shut down the engine in response to determining a starter battery voltage below a threshold voltage.

* * * * *